(No Model.)

J. B. THURSTON.
CRANK ADJUSTMENT FOR BALANCE WHEELS.

No. 291,645. Patented Jan. 8, 1884.

Witnesses.
Curwell Hutchen
W. B. Hill

Inventor.
J. B. Thurston

UNITED STATES PATENT OFFICE.

JAMES B. THURSTON, OF CONCORD, NEW HAMPSHIRE, ASSIGNOR TO JOHN A. WHITE, OF SAME PLACE.

CRANK ADJUSTMENT FOR BALANCE-WHEELS.

SPECIFICATION forming part of Letters Patent No. 291,645, dated January 8, 1884.

Application filed June 23, 1883. (No model.)

*To all whom it may concern:*

Be it known that I, JAMES B. THURSTON, a citizen of the United States, and a resident of Concord, in the county of Merrimac and State of New Hampshire, have invented a new and Improved Crank Adjustment for Balance-Wheels, of which the following is a specification.

The object of the invention is to furnish means for the change of stroke from short to long, or vice versa, of any crank-pin while the crank is in motion.

The nature of this improvement will be more clearly understood by reference to the accompanying drawings, forming part of this specification, in which similar letters of reference indicate corresponding parts in all the figures, in which—

Figure 1:
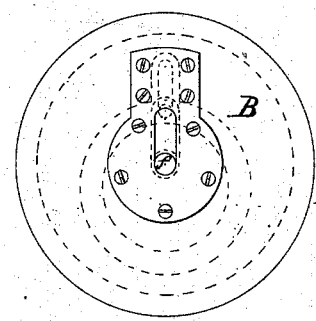
Figure 2:
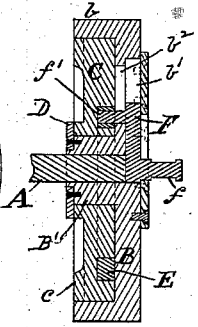
Figure 3:
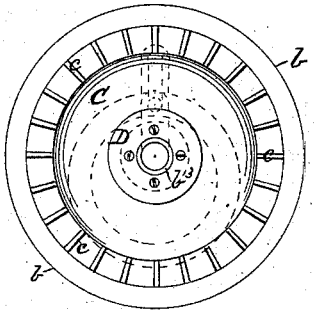
Figure 4:
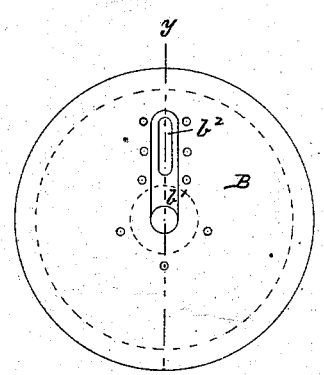
Figure 5:
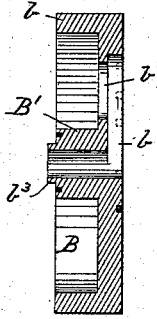
Figure 6:
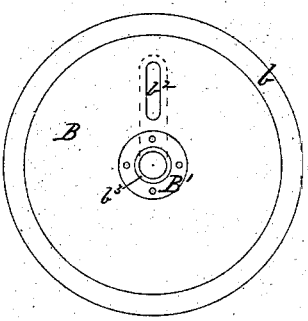
Figure 7:
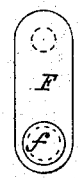
Figure 9:
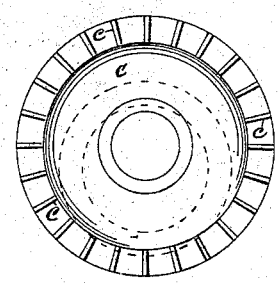
Figure 11:
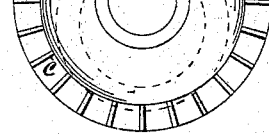
Figure 8:
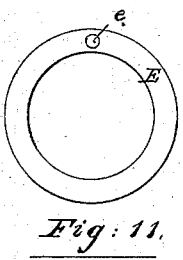
Figure 10:
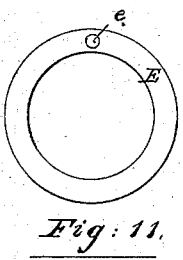

Figure 1 is a front elevation of a balance-wheel provided with my improved crank adjustment. Fig. 2 is a central vertical section of Fig. 1. Fig. 3 is a back view or opposite side to that shown in Fig. 1. Fig. 4 is a front view of that part of the balance-wheel in which is secured the counter-shaft. Fig. 5 is a sectional view of above part, taken on line Y Y. Fig. 6 represents the same part, but exposes to view the opposite side to that shown in Fig. 4. Fig. 7 is an enlarged detail view of the adjustable crank and crank-pin. Fig. 8 represents an edge view of above. Fig. 9 is a face view of the independent revolving disk, which is fitted loosely to the hub of the balance-wheel proper. Fig. 10 is the reverse side of above disk, showing an annular groove cut eccentric with the center of said disk. Fig. 11 represents an eccentric strap or ring turned to fit the annular groove in the disk.

The counter-shaft A is keyed or otherwise rigidly fastened to the balance-wheel B, one side of which is cored out annularly, thus forming hub B' and rim $b$, as shown in Figs. 5 and 6.

On the flat side of balance-wheel B is a flat-bottomed groove, $b'$, the width of which should be at least the diameter of the counter-shaft A, and extend from it two-thirds (more or less) of the distance from said shaft to the periphery of said balance-wheel in length. By reference to Fig. 5 it will be seen that this groove $b'$ is not cut clear through, but there must be a slot, $b^2$, commencing near the outer end of the groove $b'$, and extending half-way (more or less) to the center of balance-wheel, cut clear through, as is shown in Figs. 5 and 6. This slot $b^2$ is about half the width of the groove $b'$, and should be cut equidistant from either side of said groove. That portion of the hub B' which projects outside of the rim of balance-wheel is turned down so as to form the shoulder $b^3$. The disk C is turned to fit in between the hub B' and the rim $b$ of the balance-wheel, and may revolve on said hub B' independently of the counter-shaft or balance-wheel, and is held upon said hub by means of the collar D, which is fitted to the shoulder $b^3$ of the hub B', and secured thereon with four or more flat-headed machine-screws, which are countersunk so as to be flush with the outer surface of collar D. At regular intervals on the outside of the disk C are teeth $c$, and upon the reverse or inside of said disk is an annular groove, $c'$, the center of which circle is found at a point equal to about one-fifth the radius of the disk C away from the center of said disk, as shown in Fig. 10. The ring or strap E is turned to fit the groove $c'$ of the disk C, and when placed within said groove will be flush with the surface of said disk C, and will exactly fill said groove. A hole, $e$, is provided through the flat side of this ring E, the purpose of which will be hereinafter explained.

F is the improved crank, the width of which is such as to fit or correspond with that of the groove $b'$ of the balance-wheel B. Upon the front side of said crank is provided the crank-pin $f$, situated at or near one end of the same, and at or near the other end, and projected from the reverse side is provided a pin, $f'$, of smaller diameter than is the crank-pin, said pin $f'$ being turned to fit the hole $e$ in the ring E, also the slot $b^2$ in the balance-wheel B. The plate or cap-piece G, having slot $g$, corresponding in width to the diameter of crank-pin $f$, and of sufficient length to admit of the necessary play to and fro of the crank-pin $f$, is secured on the outside of balance-wheel B by means of flat-headed machine-screws.

Having embraced in this description the principal parts (in detail) required to form my improvement, I will now proceed to explain the manner of placing them, and the operation of the same. The balance-wheel B should be shrunk or keyed to the counter-shaft A, so that their motion may be identical. The independent disk C, containing the ring E, may then be placed in position upon the hub of the balance-wheel B, and the collar D screwed into place, and thereby prevent said disk C from working out of position. After turning the disk C until the hole $e$ of the ring E comes opposite with the slot $b^2$ of the balance-wheel B, the pin $f'$ of the crank F may be pushed into said hole, as shown in Fig. 2, and said crank will be permitted to enter the groove $b'$, and, by means of the cap-piece G, be held there.

To change the position of the crank-pin $f$ while the balance-wheel B is in motion, it is simply necessary to hold the disk C and prevent it from turning with said balance-wheel. The ring E will continue its motion with the balance-wheel B by means of the hole $e$ and pin $f'$, which connect it with the crank F, and as long as the disk C (having groove $c'$ within which the ring E is fitted) be held still, said ring will act as an eccentric and cause the crank F to move to and fro in the groove $b'$ in balance-wheel B, one revolution of the balance-wheel (assuming the disk C to be at rest) being sufficient to throw the crank F out its entire limit from the center, and return.

This improvement is applicable to any machines—such as jig-saws, wood-mortising machines, and many others—and for the purpose of regulating the "stroke" of the crank and fixing it at any required distance from the center of revolution the teeth $c$ upon one side of the disk C may be provided, and a bar set in bearings perpendicular to said disk, and operated laterally by means of a cam secured to the shaft A, so constructed as to throw said bar against the teeth $c$ one or more times to each revolution of the balance-wheel, and the adjustment would be accomplished with regularity and accuracy.

The mechanism employed for holding the disk may necessarily be varied, for the reason that for some machines to which this improvement may be attached the stroke could be changed at random, in which case perhaps a hand-lever could be used, while in others it may be essential to run the crank-pin $f$ out but one thirty-second or one-sixteenth of an inch every revolution, in which case it would probably be better to devise some mechanism which may be driven by power. I do not, therefore, confine myself to any particular mechanism for holding the disk, as by stopping the balance-wheel the disk could be turned by hand. Consequently the invention is complete, as represented in the drawings. A simpler form of construction would be to dispense with the ring E and allow the pin $f'$ to fill and rest within the groove $c'$ in the disk C; but the use of said ring is preferable, for by its use the possibility of the crank F being moved by centrifugal force is wholly prevented. The pin $f'$ is required simply to connect the eccentric ring E with the crank F; and whether said pin be fixed upon the side of the eccentric ring E and be turned to fit into a hole in the crank F, or whether it be attached to the crank, as shown in the drawings, is of no particular consequence, for either form of construction will admit of the same result.

Having thus fully described my invention, I claim—

1. A balance-wheel constructed substantially as hereinbefore described, provided with a hub projecting from its back side, a groove cut in its front side, of suitable dimensions to receive the sliding adjustable crank, and a cap-piece in which a slot is formed, through which the crank-pin passes, secured by screws to the outside of said balance-wheel, thereby holding said crank within said groove and partially concealing it from view, substantially as and for the purpose described.

2. The independent revolving disk so fitted upon the hub of the balance-wheel as to be readily turned on said hub or held still while said balance-wheel is revolving, that side of the said disk which comes in contact with the balance-wheel being provided with an annular groove, the circle of said groove being eccentric with the circle of said disk, said disk being prevented from working off from the hub of balance-wheel by means of a collar secured to the hub of said wheel, substantially as and for the purpose hereinbefore described and set forth.

3. The combination of an eccentric ring revolving in a groove provided for its reception in one side of the independent revolving disk, and the sliding adjustable crank operating in groove upon the outside of the balance-wheel, connected together by means of a round pin, one end of which is permanently fixed in the side of said eccentric ring, the other end of which is turned so as to be a moderately loose fit for a hole in the outer end of said crank, substantially as described, and for the purpose set forth.

4. The combination of an eccentric ring revolving in a groove provided for its reception in one side of the independent revolving disk, and the sliding adjustable crank operating in groove upon the outside of the balance-wheel, connected together by means of a round pin, one end of which may be permanently fixed into and project from the back side of the outer end of said crank, the other end of which may be turned so as to be a moderately loose fit for a hole formed through the side of the eccentric ring, substantially as described, and for the purpose set forth.

5. The sliding and adjustable crank depressed and partially concealed in the front side of the balance-wheel by means of a groove and a suitable cap-piece, the independent circular disk fitted to the hub of said balance-wheel, and secured thereon by means of a collar, and the eccentric ring fitted to and revolving in a groove formed upon the inside of said disk, and connected with the adjustable crank by means of a pin, so combined and arranged as to render the crank capable of being set at any given stroke from naught to six inch, more or less, and operating substantially as described.

JAMES B. THURSTON.

Witnesses:
W. J. CRIPPEN,
B. A. BALL.